United States Patent [19]
Manske

[11] 3,894,270
[45] July 8, 1975

[54] VOLTAGE-LIMITED DEFLECTION SYSTEM FOR A TELEVISION RECEIVER

[75] Inventor: Hans E. Manske, Addison, Ill.

[73] Assignee: Zenith Radio Corporation, Chicago, Ill.

[22] Filed: June 4, 1973

[21] Appl. No.: 366,943

[52] U.S. Cl. .................................... 315/379; 336/69
[51] Int. Cl. .............................................. H01j 29/70
[58] Field of Search ....................................... 336/69; 315/28-29, 27 XY, 20, 411, 379; 323/48; 321/24

[56] References Cited

UNITED STATES PATENTS

| | | | |
|---|---|---|---|
| 3,395,311 | 7/1968 | Hursh | 315/29 |
| 3,546,629 | 12/1970 | Walker, Jr. | 315/29 |
| 3,665,288 | 5/1972 | Godawski | 336/69 |
| 3,688,232 | 8/1972 | Szatmari | 336/69 |

*Primary Examiner*—Maynard R. Wilbur
*Assistant Examiner*—J. M. Potenza
*Attorney, Agent, or Firm*—Nicholas A. Camasto

[57] ABSTRACT

A voltage-limited deflection transformer includes a tuning capacitance integrally formed therein. A portion of the transformer winding is in the form of two strips of insulated metallic foil arranged on the core such that the foil strips form the electrodes of the capacitance required to tune the transformer. An open circuit occurring in one foil results in no DC to the transformer whereas an open circuit in the other foil substantially disables the transformer. A short circuit in the foil capacitor detunes the transformer and lowers its output voltage.

6 Claims, 5 Drawing Figures

PATENTED JUL 8 1975

3,894,270

VOLTAGE-LIMITED DEFLECTION SYSTEM FOR A TELEVISION RECEIVER

BACKGROUND OF THE INVENTION

This invention relates generally to television receiver deflection and high voltage systems and particularly to methods of precluding excessive high voltage generation in the event of a malfunction in the horizontal sweep system. In recent years, considerable attention has been devoted to the thought-to-be-harmful X-radiation which may occur from the front of a television receiver as a result of high energy electron bombardment of the phosphor screen of the picture tube. While attention has also been directed to the high voltage rectification circuitry in television receivers, which also constitutes a potential source of X-radiation, the advent of solid state rectification devices has eliminated that area of the receiver as a cause for concern. Monochrome receivers are likewise not considered to present radiation problems because of the lower high voltage employed with monochrome picture tubes. Such is not the case, however, with color television receivers—at least under the fault requirements imposed by the United States Department of Health, Education and Welfare (HEW).

It is well established that the vast majority of color television receivers of current design, when operating normally, do not exhibit excessive X-radiation. But, under abnormal operating conditions, such as those that may occur during failure modes of some of the receiver components, separate circuitry must be incorporated to preclude generation of excessive high voltage.

Recently, the HEW imposed standards upon television receiver manufacturers which, inter alia, required that the receiver not emit radiation in excess of prescribed levels, even though receiver components were placed in a failure mode. Since the source of high voltage in most color television receivers is a tuned horizontal sweep transformer (the output of which could increase substantially should an open circuit occur in the tuning capacitance therefor), it was necessary to incorporate relatively expensive and cumbersome prevention circuits to preclude excessive high voltage generation in the event of component failure. While such circuits have proven quite effective, the present invention provides a high voltage limited sweep transformer system which includes means reducing the transformer output voltage in the event of failure in the tuning capacitance. In the described embodiment, the tuning capacitance is built into the transformer winding thus enabling an economical self-contained arrangement.

OBJECTS OF THE INVENTION

A primary object of this invention is to provide an improved television receiver.

Another object of this invention is to provide a novel high voltage limited television receiver.

SUMMARY OF THE INVENTION

In accordance with this invention, a horizontal sweep transformer system is connected to a B+ source over the electrodes of the tuning capacitance. An open circuit failure of the capacitance results in interruption of B+ to the transformer and total loss of voltage output therefrom, or in substantial disablement of the transformer, depending on where the open circuit occurs. A short circuit failure of the capacitor results in detuning the transformer in a direction and amount such that the output voltage therefrom falls. The described embodiment of the invention discloses a sweep transformer having a magnetically permeable core with an electrical winding wound thereon configured such that part of the winding forms the tuning capacitance for tuning the transformer to resonance at its design frequency.

DESCRIPTION OF THE PREFERRED EMBODIMENT

Figure 1:
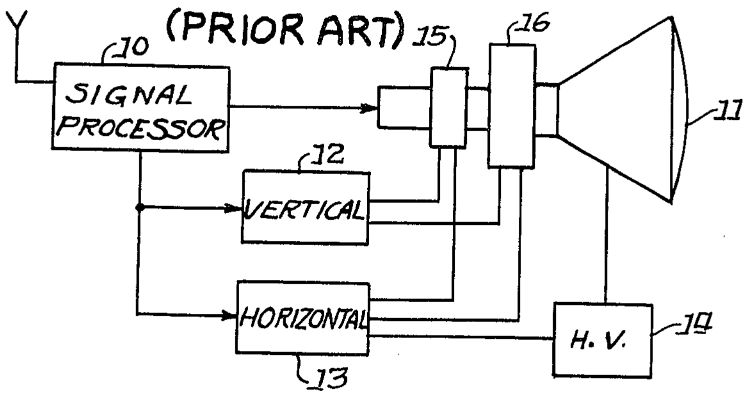
FIG. 1 represents a block diagram of a prior art television receiver.

Referring to FIG. 1, there is shown a block diagram of a television receiver comprising a signal processor 10 for receiving and translating broadcast television signals and supplying both the luminance and chrominance information contained therein to a color cathode ray tube 11. Signal processor 10 supplies a vertical circuit 12 and a horizontal circuit 13 both of which in turn provide appropriate vertical and horizontal signals to a convergence yoke 15 and a deflection yoke 16. Another output of horizontal circuit 13 supplies a high voltage circuit 14 which is connected to and supplies the ultor or second anode of picture tube 11. The television circuit of FIG. 1 and the functioning of its various components are well-known in the art and need no detailed description. The vertical and horizontal circuits supply appropriately shaped currents to deflection yoke 16 for establishing the vertical and horizontal deflection fields needed to scan the electron beams over the phosphor screen of picture tube 11. Currents for adjusting the deflection waveforms in accordance with electron beam location for performing beam convergence correction are also supplied.

While high voltage circuit 14 may be conventional, it preferably comprises a solid state voltage multiplier circuit for effectively multiplying the peak voltage produced by the horizontal transformer. The multiplication circuitry simplifies transformer construction and readily lends itself to the use of the present invention because the lower voltages encountered in the transformer relax the insulation requirements for the foil turns.

Figure 2:
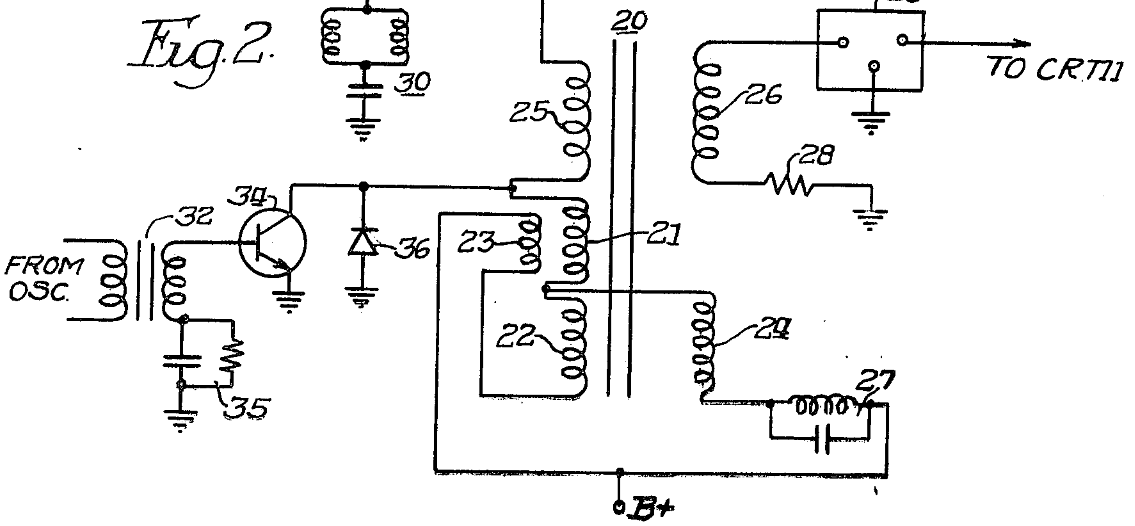
FIG. 2 represents a schematic diagram of a horizontal sweep circuit and transformer constructed in accordance with the invention.

FIG. 2 is a schematic diagram of the novel horizontal sweep transformer circuitry in horizontal circuit 13. A horizontal transformer 20 comprises a magnetically permeable core having a plurality of primary winding segments 21, 22 and 23, a secondary winding 25 (connected in autotransformer fashion), a tertiary winding 26 and a link winding 24. A source of B+ supplies current through portions of the transformer windings to the collector of a horizontal output transistor 34, the base of which is driven from a coupling transformer 32. Coupling transformer 32 is fed an oscillatory input signal from a horizontal oscillator transistor (not shown). A resistance capacitance bias network 35 returns the secondary of coupling transformer 32 to ground.

A damper diode 36 is connected across the collector of transistor 34. Diode 36, transistor 34 and transformer 20 cooperate in a well-known manner to generate, from the oscillator input, an increasing current of relatively long duration in yoke horizontal circuit 30 during trace periods corresponding to occurrence of picture information and relatively short duration pulses of high amplitude during the retrace periods when the electron beams in the picture tube are returned to their starting positions. The trace interval in a 525 line system is 63 microseconds (the total line interval) − 12 microseconds (the retrace pulse duration) = 51 microseconds. Secondary winding 25 feeds the yoke horizontal circuit 30 which, it will be understood, forms a part of deflection yoke 16 mounted on the picture tube. A corresponding yoke vertical circuit (not shown) will be understood to be included in yoke 16.

A tertiary winding 26 provides a high voltage output for application to a multiplier 29. Winding 26 is returned to ground through a current limiting resistor 28 for preventing excessive currents being drawn by the multiplier in the event of fortuitous internal flashovers in the picture tube. Multiplier 29 preferably is a voltage "tripler" and includes a plurality of diodes and capacitors interconnected in series-parallel fashion for producing approximately three times the peak voltage developed by tertiary winding 26 of transformer 20.

With the exception of portions of its primary winding, transformer 20 is conventional and in accordance with common usage has its tertiary tuned to a frequency different from the one to which the primary is tuned. The reasons therefor are beyond the scope of this disclosure, but suffice it to say that a properly wave-shaped high voltage pulse is desirable and tuning of the tertiary to an odd harmonic of the retrace pulse ringing frequency (the reciprocal of the retrace pulse period) assists in obtaining that objective. Thus, the primary windings are tuned to resonate at the line scanning frequency of 15,750 KHz (corresponding to a total line time or period of 63 microseconds), whereas the tertiary is tuned to an odd multiple of the retrace pulse ringing frequency. In practice the fifth harmonic is utilized. This is accomplished by loosely coupling the teritary winding to the primary winding (by physically separating the windings on opposite legs of the core) and separately tuning the tertiary. In order to facilitate energy transfer from the primary winding segments to the tertiary winding, a link winding 24 is added which "links" both the primary and the tertiary. Link winding 24 is electrically in parallel with part of the primary winding and is wound under the tertiary winding. An external resistance-capacitance network 27 is tuned to anti-resonance at either the third or the seventh harmonic of the retrace pulse ringing frequency to prevent undesirable intercoupling between the primary winding segments and the tertiary winding at selected frequencies.

Primary winding segments 21 and 23 are preferably bifilar wound and are in the form of strips of conductive foil interleaved with an appropriate dielectric material to form a capacitance. Primary winding segment 23 is connected in series between B+ and primary winding segment 22 and is wound in series-aiding relationship to the flux established by the current in primary winding segments 21 and 22. Link winding 24 is also bifilar and is connected to B+ through tuning network 27 and to the junction of winding segments 21 and 22. As mentioned above, link winding 24 is wound under tertiary winding 26 and is also poled to assist transformer flux development. Winding segments 21 and 23, which subsequently will be described in more detail, comprise a built-in tuning capacitance for tuning the transformer primary to the line scanning frequency. The B+ path to the collector of transistor 34 through foil 23 is in parallel to the B+ path serially traversing foil 21. An interruption in foil 21 interrupts the transformer completely. An interruption in foil 23 disables winding segments 23 and 22 and reduces the transformer voltage also.

Figure 3:
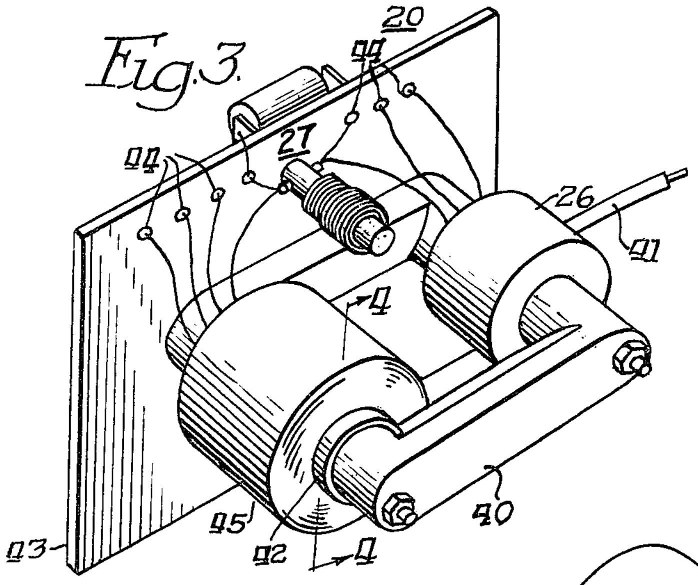
FIG. 3 is a perspective view of a sweep transformer similar to the one shown schematically in FIG. 2.

FIG. 3 shows a transformer construction which may be advantageously used in practicing the invention. Transformer 20 includes a rectangularly shaped ferrite core 40 having windings on opposite legs thereof. Tertiary winding 26, and link winding 24 (not shown), are on the upper leg and the primary and secondary windings are wound on the lower leg. An insulated mounted board 43 serves to support the core and other components such as tuning network 27, which is illustrated as a coil and capacitor. A plurality of connecting terminals 44 are used to connect the winding segments to external circuitry. A high voltage lead 41 conveys the output voltage of the transformer to high voltage multiplier 29 shown in FIG. 2. As stated earlier, the separation of the tertiary winding minimizes coupling with the primary and enables use of a link winding with consequent different tuning on each "side" of the transformer.

Figure 4:
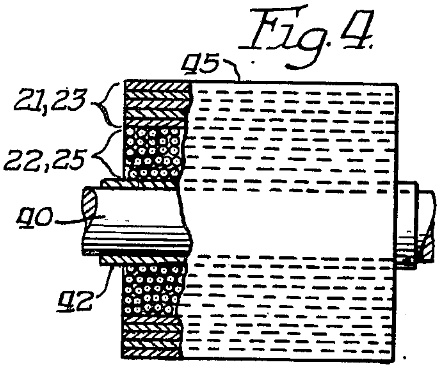
FIG. 4 is an idealized cross-sectional view of one of the windings of the transformer of FIG. 3 which includes a built-in tuning capacitance arranged according to the invention.

FIG. 4 represents an illustrative cross-sectional view taken on the lower coil and the transformer core. As may be seen, an insulated coil form 42 is provided for supporting the windings on core 40. A plurality of layers of wire comprising winding segments 22 and 25 are wound on the form. The outer layers comprise foil windings 21 and 23 which are arranged to establish a predetermined value of tuning capacitance for tuning the primary of transformer 20 to 15,750 KHz. The arrangement is idealized and is not intended to represent actual winding construction. In addition, insulation layers have been omitted, as well as connection wires. To minimize the size of capacitance required to tune the transformer, it is preferable to connect it across the largest inductance. Thus the capacitance is located at the terminations of the primary winding. It can, of course, be inserted anywhere in the primary winding, but the smaller the inductance across it, the larger the capacitance must be to tune to the same frequency.

Figure 5:
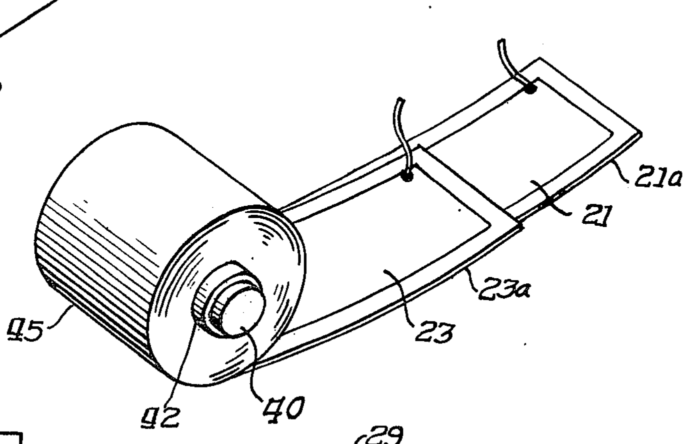
FIG. 5 is an idealized perspective of the coil of FIG. 4, showing the foil construction of the winding.

FIG. 5 shows a view of the idealized coil on the lower leg of transformer 20 in FIG. 3 with a portion of the foil-turns unrolled to illustrate construction of winding layers forming the tuning capacitance. Conductive foils 21 and 23 are separated by insulating layers 21*a* and 23*a*. The insulating layers extend beyond the edges of the foil as shown to preclude the possibility of voltage breakdown therebetween. The foils and coil 45 of the transformer are preferably impregnated with a silicon-based impregnant.

It has been found that a sufficient capacitance may be obtained with two pieces of foil approximately one inch wide and 24 inches long. The foil may be of 0.0002 inch thick aluminum mounted on 0.006 inch mylar insulating base. As actually constructed, the foil turns occupy approximately eight layers overwinding 150 turns (five layers) of number 26 wire. The link winding 24 consists of 100 turns of number 28 wire under the tertiary winding.

With this arrangement, the capacitor electrodes form a portion of the transformer winding and are connected in series between the B+ source and the horizontal output transistor. Consequently, a failure in the foil (open circuit in the capacitor) will interrupt the current supply to the output transistor and preclude any rise in transformer voltage output. In the event of a "short" circuit condition, that is, a foil-to-foil electrical contact in the capacitor, the result is a substantial detuning of the primary of the transformer and consequent lowering of its output voltage.

What has been described is a novel arrangement providing the voltage limited horizontal sweep transformer system for a televison receiver in the preferred embodiment of which the tuning capacitance for the transformer is integrally wound as part of the transformer winding. It will be obvious to those skilled in the art that various changes and modifications may be made without departing from the invention in its broader aspects. Accordingly, the aim in the appended claims is to cover all such changes and modifications as may fall within the true spirit and scope of the invention.

What is claimed is:

1. A television receiver including: a picture tube and associated deflection apparatus, said tube requiring a high DC potential; a tuned sweep transformer supplying appropriate currents to said deflection apparatus; high voltage amplifying and rectifying means for producing said high DC potential from the output of said tuned sweep transformer, said transformer having an output voltage generating capability, in the event of failure occurring in any of the components associated therewith, which is in excess of a predetermined safe level; a source of B+ potential; and tuning capacitance means having electrodes DC connected between said source and said transformer whereby in the event of failure of said capacitance, the voltage generated by said sweep transformer decreases.

2. A television receiver as set forth in claim 1, wherein said transformer includes a plurality of primary winding segments; the electrodes of said capacitor being connected in series between said source of B+ and one of said primary winding segments.

3. For use in a television receiver including a picture tube and associated scansion apparatus, said tube requiring a high DC potential, a tuned sweep transformer supplying appropriate scansion currents to said scansion apparatus, and high voltage amplifying and rectifying means for producing said high DC potential from the output of said tuned sweep transformer, said television receiver requiring means limiting the maximum value of said high DC potential to a predetermined safe level in the event of a failure occurring in any of the components associated with said tuned sweep transformer, an economical voltage limited sweep transformer for said receiver comprising: a magnetically saturable core; an electrical winding wound on said core; and a built-in tuning capacitance arranged such that the electrodes thereof comprise portions of said winding whereby in the event of failure of the capacitance, the output of said sweep transformer decreases.

4. A sweep transformer as set forth in claim 3, wherein said portions of said winding consist of conductive foil and dielectric insulating material.

5. A sweep transformer as set forth in claim 4, further including a source of B+ potential connected to said electrical winding, said capcitance being arranged such that current from said source must serially traverse said electrodes of said built-in capacitance to energize said transformer.

6. A sweep transformer as set forth in claim 5, wherein the foil portions of said winding are positioned near the extremities of said winding.

* * * * *